United States Patent Office 3,549,672
Patented Dec. 22, 1970

3,549,672
3-ALKOXY-17-HYDROXYGONA-2,5(10)-DIENES
Thomas B. Windholz, Westfield, and Arthur A. Patchett, Cranford, N.J., and John Fried, Palo Alto, Calif., assignors to Merck & Co., Inc., Rahway, N.J., a corporation of New Jersey
No Drawing. Continuation-in-part of application Ser. No. 227,559, Oct. 1, 1962. This application Mar. 22, 1966, Ser. No. 536,286
Int. Cl. C07c *169/20*
U.S. Cl. 260—397.5          2 Claims

ABSTRACT OF THE DISCLOSURE

The invention disclosed herein relates generally to novel steroid compounds and processes for preparing the same. More particularly, it relates to novel 3-alkoxy-17-hydroxy-gona - 2,5(10) - dienes, their 17α-substitution products, esters of the foregoing, and the process of preparing these novel gona-2,5(10)-diene steroids from certain polycyclic condensation products. In this process, 3 - methoxy - 13-ethyl-8,14-secogona - 1,3,5(10),9(11) - tetraene - 14,17-dione starting material is heated in the presence of acidic catalyst thereby effecting ring closure to form 3-methoxy-13-ethyl-gona-1,3,5(10),8,14-pentaen - 17 - one which is selectively hydrogenated at the $\Delta^{14}$ double bond to produce 3-methoxy-13-ethyl-gona-1,3,5(10),8-tetraen-17-one which upon further reduction with sodium borohydride is converted to 3 - methoxy - 13 - ethyl-gona - 1,3,5(10), 8-tetraen-17β-ol; the latter compound is still further reduced with lithium in liquid ammonia thereby forming 3-methoxy-13-ethyl-9α,14α-gona - 2,5(10) - dien - 17β-ol. The 17α-substitution products of the foregoing are conveniently prepared by oxidizing the 17β-ol to a 17-ketone, and reacting the latter with a ketone reactive addition compound such as lithium acetylide to form the corresponding 17-α-ethynyl-17β-ol compound. The steroids of this invention possess utility as anabolic and/or progestational agents. Because of their progestational activity, they may be used to regulate the estrus cycle in domestic animals and in cases of menstrual disturbances may be used to reestablish the normal relationships between the anterior-pituitary, ovary and endometrium which are present in a normal estrus cycle. They may also be used to synchronize the estrus cycles of a herd or colony of domestic animals or to chronically suppress estrus in domestic animals. When used for these purposes, they may be supplied together or in succession with an estrogenic hormone.

---

This application is a continuation-in-part of United States application, Ser. No. 227,559, filed Oct. 1, 1962, now abandoned.

The novel compounds of this invention may be administered orally or parenterally and for this purpose a wide variety of oral or parenteral dosage forms may be used in which they may be present singly, or in admixture with another active ingredient, such as an estrogen. In the various dosage forms, they can be combined with an inert solid diluent or dissolved, dispersed, or suspended in a suitable liquid carrier. When combined with an inert solid diluent, they may be in suitable dosage unit form, more particularly in the form of a tablet, powder, capsule or the like. When combined with a liquid diluent, the composition may be in the form of a solution, emulsion, suspension or the like. The novel compounds of this invention may also be formulated into an ointment, cream, lotion, or the like, which is suitable for topical administration, and in this form they may be combined with an additional active ingredient, such as an antibiotic, germicide, or the like.

The polycyclic condensation products, which are the starting materials for the steroids of this invention, are denoted as 3-alkoxy-8,14-secogona-1,3,5(10),9(11)-tetraene-14,17-diones which have hydrogen or other substituents in the C–13 position (Compound I), wherein $R_1$ is an alkyl radical and Z is a member selected from the group consisting of a hydrogen atom, an alkyl radical having at least 2 carbon atoms, —$CH_2M$ and —$CHM_2$ radicals in which M is a member selected from the group consisting of —$COOR_4$, —$OR_4$ and —CN radicals, $R_4$ being a lower alkyl radical.

The starting material utilized in the preparation of the aforementioned polycyclic condensation products is a 1-vinyl-6-alkoxy-1-tetralol, which may be represented by the following structural formula:

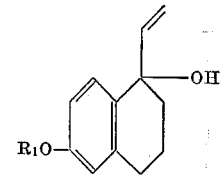

wherein $R_1$ is an alkyl radical, preferably having from 1 to 9 carbon atoms. These compounds may be prepared by the method reported in Dokladii Akad. Nauk SSSR 112, 1067 (1957) for 1-vinyl-6-methoxy-1-tetralol.

It has been found that 1-vinyl-6-alkoxy-1-tetralol will react with cyclopentane-1,3-diones to form Compound I. The preferred cyclopentane-1,3-diones that are operable herein may be generically denoted as 2-Z-cyclopentane-1,3-diones and may be chemically represented as follows:

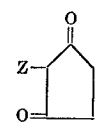

wherein Z has the same significance as above. The interaction of 1-vinyl-6-alkoxy-1-tetralol and the foregoing cyclopentane-1,3-diones to provide Compound I is preferably conducted by dissolving the 1-vinyl-6-alkoxy-1-tetralol in an inert organic solvent containing a small amount of a strong basic catolyst such as benzyltrimethyl ammonium hydroxide, adding the desired cyclopentane-1,3-dione compound and heating the mixture, preferably under reflux conditions, until the reaction is complete. Compound I may then be recovered by conventional laboratory techniques. The organic solvent should preferably be one having a boiling point in excess of 70° C. Among the organic solvents that are operable herein are aromatic hydrocarbons, such as benzene, toluene and xylene, and aliphatic alcohols, such as, for example, tert-butanol and sec-pentanol, as well as mixtures of said aromatic hydrocarbons and said aliphatic alcohols. Other strong basic catalysts that are operable herein are alkali metal alkoxides, such as sodium methoxide and potassium t-butoxide and alkali metal hydroxides, such as sodium hydroxide and potassium hydroxide.

In accordance with the present invention the novel 3-alkoxy-17-hydroxygona-2,5(10)-dienes, 17α-substitution products thereof and their esterification products are synthesized by a series of reactions starting with Compound I which are illustrated by the following flow sheet:

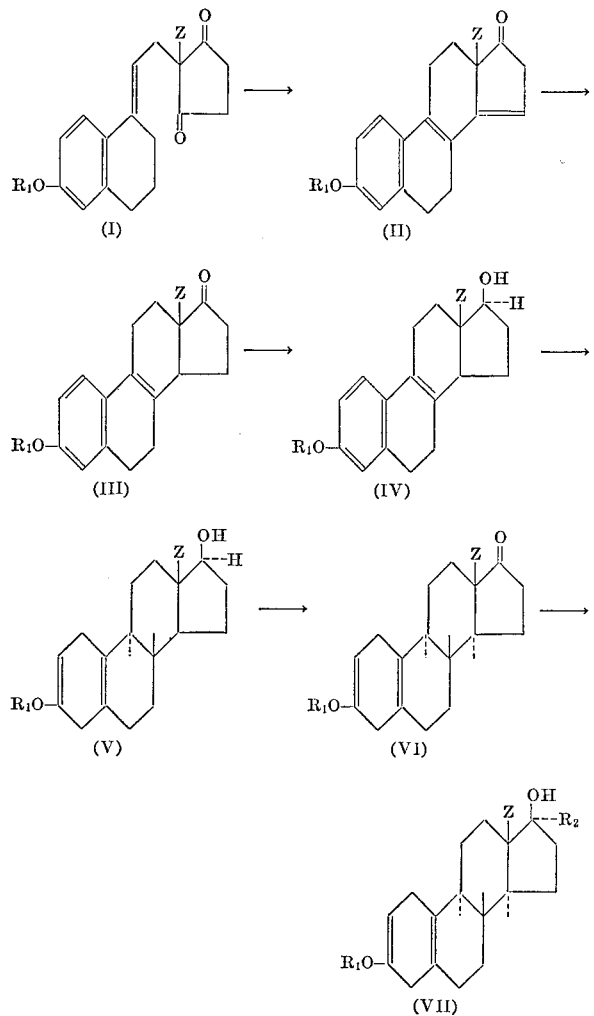

wherein $R_1$ and Z have the same significance as above; $R_2$ is a member selected from the group consisting of a hydrogen atom and lower alkyl, allyl, methallyl, vinyl, ethynyl, haloethynyl, $-CF=CF_2$ and $-C\equiv C-CF_3$ radicals; and $R_3$ is a member selected from the group consisting of a hydrogen atom and a lower alkanoyl radical.

The preparation of the novel steroids comprises subjecting the Compound I to ring closure by means of an acid catalyzed condensation reaction, thereby forming the corresponding 3-alkoxy - 13-Z-gona - 1,3,5(10),8,14-pentaen-17-one steroid compounds (Compound II); subjecting Compound II to three successive reduction steps to form 3-alkoxy-13-Z-gona-1,3,5(10),8 - tetraen-17-one (Compound III), 3-alkoxy - 13 - Z - gona-1,3,5(10),8-tetraen-17β-ol (Compound IV), and 3-alkoxy-13-Z-9α, 14α-gona-2,5(10)-dien-17β-ol (Compound V), oxidizing the 17-hydroxy group of Compound V to yield 3-alkoxy-13-Z-gona-2,5(10)-dien-17-one (Compound VI), reacting Compound VI with a ketone reactive additional substance and a proton denoting material, said addition substance being capable of providing an $R_2$ group for addition onto the carbon atom of the 17-keto group, thereby forming the corresponding 3-alkoxy - 13-Z-17α-$R_2$-gona - 2,5(10) dien-17-ol (Compound VII).

Accordingly, in a preferred procedure, Compound I (exemplified herewith by 3-methoxy - 13 - ethyl-8,14-secogona-1,3,5(10),9(11)-tetraene-14,17 - dione) is subjected to ring closure by heating a solution thereof in an inert organic solvent in the presence of an acidic catalyst, which acts as a source of hydrogen ions. Among the preferred organic solvents that are operable herein are aromatic hydrocarbons having a boiling point over 70° C. such as benzene, toluene and xylene. In order that the reaction proceed properly, the temperature should be above 50° C. and, preferably, at the reflux temperature of the particular solvent employed. Among the preferred acidic catalysts that are operable herein are organic acids, such as para-toluenesulfonic acid and 2,4-dinitrobenzene sulfonic acid, and mineral acids, such as hydrochloric acid and sulfuric acid. The resulting 3-methoxy-13-ethyl-gona-1,3,5(10),8,14-pentaen-17-one may then be recovered by conventional techniques such as by extraction with suitable organic solvents. The water which is formed during the course of the reaction is preferably removed by using a Dean-Stark type of water separator when refluxing the mixture.

The resulting 3-methoxy-13-ethyl-gona-1,3,5(10), 8,14-pentaen-17-one is then subjected to selective reduction of the $C_{14}=C_{15}$ double bond, as, for example, by hydrogenation, using palladium on barium carbonate as the catalyst or a Raney nickel catalyst of moderate activity until one stoichiometric equivalent of hydrogen is taken up. The 17-keto group of the resulting 3-methoxy-13-ethyl-gona-1,3,5(10),8-tetraen-17-one is further reduced by means of a hydride-transfer reagent, such as a metal hydride, sodium borohydride and lithium aluminum hydride being preferred metal hydrides. The resulting 3-methoxy-13-ethyl-gona-1,3,5(10),8-tetraen-17β-ol is then subjected to further reduction by treatment with an alkali metal, such as potassium or lithium, in liquid ammonia to yield 3-methoxy-13-ethyl-9α,14α-gona-2,5(10)-dien-17β-ol.

The 17β-hydroxy group of the resulting 3-methoxy-13-ethyl-9α,14α-gona-2,5(10)-dien-17β-ol is then subjected to an Oppenauer oxidation reaction to yield 3-methoxy-13-ethyl-gona-2,5(10)-dien-17-one. For example, the 3-methoxy-13-ethyl-9α,14α-gona-2,5(10)-dien-17β-ol is added to an aromatic hydrocarbon solvent, such as benzene, toluene or xylene, and refluxed with an excess of an aliphatic ketone, such as acetone, or a cylic ketone, such as cyclohexanone, in the presence of a metallic alkoxide, such as aluminum isopropoxide or aluminum tertiary butoxide.

The resulting 3-methoxy-13-ethyl-gona-2,5(10)-dien-17-one is then reacted with a ketone reactive addition substance, as described more fully hereinafter, to yield a 17α-substituted derivative of 3-methoxy-13-ethyl-gona-2,5(10)-dien-17β-ol.

An important step in the foregoing series of reactions is the reaction of a ketone reactive addition substance with the 17-keto group of Compound VI to give a product with a 17β-hydroxyl group and a 17α-oriented addition group ($R_2$). The 17-keto group of Compound VI undergoes addition of Grignard reagents, wherein the organo group is selected from the class consisting of lower alkyl, allyl, methallyl, ethynyl, vinyl, trifluoromethylethynyl and trifluorovinyl radicals, such that the organo group adds onto the 17-carbon atom. The magnesium salt of the weakly acidic alcohol that is thus produced is easily converted into the 17β-alcohol by the addition of a proton donating substance, such as water.

Similar additions have been found to occur between alkali metal acetylides, alkali metal haloacetylides and organo-lithium compounds, such as methyl lithium and ethyl-lithium, and the 17-keto group of Compound VI. In this reaction, the acetylide, haloacetylide or organo group attacks the carbonyl-carbon atom and the metal adds onto the carbonyl-oxygen atom to form the corresponding salt which is in turn coverted into the 17β-hydroxy compound in the presence of a proton donator.

It has also been found that the 17-keto group of Compound VI undergoes reduction by means of a hydride-transfer reagent, such as a metal hydride, preferably sodium borohydride or lithium aluminum hydride.

In this reduction, the carbonyl compound to a salt which may then be converted to the corresponding 17β-hydroxy compound by means of a proton donator.

The solvents utilized in the foregoing addition reactions are inert organic solvents that are well known for each type of ketone additive employed. For example, with the Grignard, organo-lithium and acetylide addition reagents, tetrahydrofuran, alkyl ethers, such as dimethyl ether, methyl ethyl ether and diethyl ether and aromatic hydrocarbons, such as benzene, toluene and xylene, are preferred as solvents. In hydride transfer reductions, the lower alkanols, such as methanol and ethanol, are preferred. The solvent should obviously be void of any reactive unsaturated linkages capable of undergoing addition with the ketone additives utilized herein.

In general terms, the addition reaction is conducted by reacting Compound VI in an inert organic solvent with a ketone reactive addition substance capable of providing a nucleophilic $R_2$ group for addition onto the carbon atom of the 17-keto group and an electrophilic portion for addition onto the oxygen atom of the 17-keto group, said $R_2$ being a hydrogen atom or lower alkyl, allyl, methallyl, vinyl, ethynyl, haloethynyl, trifluoromethylethynyl and trifluorovinyl radical. The resulting salt is converted to the corresponding 17β-hydroxy compound by providing a source of protons to react with said salt, thereby forming Compound VII.

Compound VII may be converted to a corresponding 17β-alkanoyl ester by reaction with an alkanoic acid anhydride or alkanoyl halide in the presence of a tertiary amine such as pyridine. The acid anhydrides which may be used for this purpose include acetic anhydride, propionic acid anhydride and butyric acid anhydride. The 17β-caproate may be prepared by the reaction of the respective 17-hydroxygona-compound with caproyl halide in the presence of a tertiary amine base.

The following examples illustrate methods of carrying out the present invention but it is understood that these examples are given for purposes of illustration and not of limitation.

EXAMPLE 1

This example illustrates the preparation of 3-methoxy-13 - methyl - 8,14 - secogona - 1,3,5(10),9(11)-tetraene-14,17-dione.

4.10 grams of 1-vinyl-6-methoxy-1-tetralol are dissolved in a mixture of 14 ml. dry xylene and 7 ml. dry tertiary butanol. To this is added 2.24 g. of 2-methylcyclopentane-1,3,-dione and 0.75 ml. of a 40% methanolic solution of benzyltrimethylammonium hydroxide and the mixture refluxed for one hour. After cooling and diluting with ether, some unreacted methylcyclopentanedione is filtered off and the ether solution washed successively with aqueous $NaHCO_3$, 5% KOH, water and dried. The concentrated solution affords a viscous oily residue with a characteristic U.V. absorption at λ max. 2725 and a carbonyl absorption at 5.80μ in the I.R. Crystallization from ether yields 3-methoxy - 13 - methyl - 8,14 - secogna-1,3,5(10),9(11)-tetraene-14,17-dione (M.P.=77–79° C.).

In accordance with the above procedure, 2-ethylcyclopentane - 1,3 - dione is reacted with 1-vinyl-6-ethoxy-1-tetralol, 1-vinyl-6-propoxy-1-tetralol, 1-vinyl-6-butoxy-1-tetralol and 1-vinyl-6-pentoxy-1-tetralol, respectively, to yield the corresponding 3-alkoxy derivative of 13-ethyl-8,14-secogona-1,3,5(10),9(11)-tetraene-14,17-dione.

EXAMPLE 2

This example illustrates a method of preparing 2-Z-cyclopentane-1, 3-dione derivatives that are utilized in this invention. The method involves three steps, to wit, (1) the preparation of a triketoglyoxalate, (2) the preparation of a diketosemicarbazone, and (3) the preparation of a cyclopentadione, as illustrated more specifically immediately hereinafter with the preparation of 2-methylcyclopentane-1,3-dione.

Step 1.—Preparation of 4-methyl-2,3,5-trioxocyclopentane glyoxylic acid ethyl ester 108 grams (2 moles) of fresh sodium methoxide are carefully dissolved in ice-cooled 580 ml. absolute alcohol and then cooled to 5° C. With stirring and continued cooling a mixture of 72 g. (1 mole) of ethylmethylketone and 320 g. (2.2 moles) of diethyloxalate is added over a period of 30 minutes and then heated at 50° C. for 40 minutes. The mixture is cooled in an ice bath and, with strong stirring, a cold mixture of 55 ml. conc. $H_2SO_4$ and 55 ml. $H_2O$ is slowly added. After addition, the reaction mixture is allowed to come to room temperature and the salt filtered. The filttate is concentrated in vacuo to about 200 ml. On cooling, a precipitate is obtained, which is recrystallized from ethyl acetate. The resulting crystalline product, 4-methyl-2,3,5-trioxocyclopentane glyoxylic acid ethyl ester, is filtered and dried; yield: 70 g.; M.P. 158–160° C.

Step 2.—Preparation of 3-methyl-2,4-cyclopentadine-1-semicarbazone 70 grams (0.31 mole) of the triketoglyoxalate obtained from Step1 is suspended in 1050 ml. 2.5 N HCl and slowly heated with stirring to reflux. After refluxing for about 1 hour, the solution is cooled to room temperature and added to an equal volume of alcohol. At room temperature there is then added dropwise with stirring over a period of 1½ hours a solution of 53.5 g. (0.79 mole) of semicarbazide-HCl and 74 g. of Na-acetate in 490 ml. $H_2O$. A precipitate of 3-methyl-2, 4-cyclopentadine-1-semicarbazone is obtained; yield: 54 g. The material has no sharp melting point, decomposing around 290° C.

Step 3.—Preparation of 2-methylcyclopentane-1,3-dione

Fifty-four grams of KOH are dissolved with stirring in 540 ml. ethylene glycol and the solution heated to 130° C. Fifty-four grams of the semicarbazone obtained in Step 2 is then added gradually and with stirring and the mixture refluxed for 1½ hours. The mixture is then cooled and concentrated under a vacuum (0.5 mm.) to dryness. The residue is dissolved in water, ice-cooled and acidified to pH 3. A precipitate of 2-methylcyclopentane-1,3-dione is obtained which is filtered off and dried; yield: 27.4 g.; M.P. 205–208° C.

EXAMPLE 3

The procedures of Example 2 are followed except that equivalent quantities of other ketones are utilized in place of the ethylmethyl ketone of Step 1 therein, thereby obtaining various derivatives of cyclopentane-1,3-dione. Accordingly, the use of other lower alkylmethyl ketones, such as propylmethyl ketone, isobutylmethyl ketone, n-butylmethyl ketone and amylmethyl ketone, yields the corresponding 2-lower alkyl-cyclopentane-1,3-dione compounds, such as 2-ethyl-cyclopentane-1,3-dione, 2-isopropyl - cyclopentane-1,3-dione, 2-n-propyl-cyclopentane-1,3-dione and 2-n-butyl-cyclopentane-1,3-dione, respectively. In like manner, the use of etherified methyl ketones having the formula $CH_3$—CO—$CH_2$—$CH_2OR''$, wherein R'' is an alkyl radical preferably having from 1 to 5 carbon atoms, such as β-methoxyethyl methyl ketone, β-ethoxyethyl methyl ketone, β-propoxyethyl methyl ketone, β-butoxyethyl methyl ketone and β-amyloxyethyl methyl ketone, yields the corresponding 2-alkoxymethyl derivatives of cyclopentane-1,3-dione, such as 2-methoxymethyl-cyclopentane-1,3-dione, 2-ethoxymethyl-cyclopentane-1,3-dione, 2-propoxymethyl-cyclopentane-1,3-dione, 2-butoxymethyl-cyclopentane-1,3-dione and 2-amyloxymethyl-cyclopentane-1,3-dione, respectively.

EXAMPLE 4

Using the same procedure as in Example 1, 1-vinyl-6-methoxy-1-tetralol is reacted with the 2-Z-cyclopentane- 1,3-diones prepared in Example 3 to yield the corresponding 3-methoxy-13-Z-8,14-secogona-1,3-5(10),9-(11)-tetraene-14,17-dione compounds, as shown in Table I.

This example illustrates the preparation of 3-methoxy-13 - Z - secogona - 1,3,5(10),9(11)-tetraene-14,17-dione wherein Z is a hydrogen atom, an alkyl radical having at least 2 carbon atoms, and an alkoxymethyl radical.

The mixture is then stirred to room temperature for 12 hours. The mixture is worked up by acidifying with acetic acid, concentrating in vacuo, and extracting the residue with benzene. The dried benzene solution affords the corresponding 17β-carbinol derivative which is recrystallized from ether.

TABLE I

| 2-R-cyclopentane-1,3-dione | Corresponding 3-methoxy-13-R-8,14-secogona-1,3,5(10),9-(11)-tetraene-14,17-dione |
| --- | --- |
| Cyclopentane-1,3-dione | 3-methoxy-8,14-secogona-1,3,5(10),9,(11)-tetraene-14,17-dione. |
| 2-ethyl-cyclopentane-1,3-dione | 3-methoxy-13-ethyl-8,14-secogona-1,3,5(10),9(11)-tetraene-14,17-dione. |
| 2-isopropyl-cyclopentane-1,3-dione | 3-methoxy-13-isopropyl-8,14-secogona-1,3,5(10),9(11)-tetraene-14,17-dione. |
| 2-n-propyl-cyclopentane-1,3-dione | 3-methoxy-13-n-propyl-8,14-secogona-1,3,5(10),9(11)-tetraene-14,17-dione. |
| 2-n-butyl-cyclopentane-1,3-dione | 3-methoxy-13-n-butyl-8,14-secogona-1,3,5(10),9(11)-tetraene-14,17-dione. |
| 2-methoxymethyl-cyclopentane-1,3-dione | 3-methoxy-13-methoxymethyl-8,14-secogona-1,3,5(10),9(11)-tetraene-14,17-dione. |
| 2-ethoxymethyl-cyclopentane-1,3-dione | 3-methoxy-13-ethoxymethyl-8,14-secogona-1,3,5(10),9(11)-tetraene-14,17-dione. |
| 2-pentoxymethyl-cyclopentane-1,3-dione | 3-methoxy-13-pentoxymethyl-8,14-secogona-1,3,5(10),9(11)-tetraene-14,17-dione. |

EXAMPLE 5

Using the same procedure as in Example 1, the 2-Z-cyclopentane-1,3-diones prepared in Example 3 are reacted, respectively, with 1-vinyl-6-ethoxy-1-tetralol, 1-vinyl-6-propoxy-1-tetralol, 1-vinyl-6-butoxy-1-tetralol and 1-vinyl-6-pentoxy-1-tetralol to yield the corresponding 3-alkoxy derivatives of 13-Z-8,14-secogona-1,3,5(10),9(11)-tetraene-14,17-dione.

EXAMPLE 6

Preparation of 3-alkoxy-13-Z-gona-1,3,5(10),8,14-pentaen-17-one compounds

Each of the respective 3-alkoxy-13-Z-8,14-secogona-1,3,5(10),9(11)-tetraene-14,17-diones obtained from Examples 4 and 5, wherein Z is a hydrogen atom or an ethyl, isopropyl, n-propyl, n-butyl, difluoromethyl, trifluoromethyl or alkoxymethyl radical, is converted into the corresponding 3-alkoxy-13-Z-gona-1,3,5(10),8,14-pentaen-17-one compound by the following procedure.

2.5 grams of the respective 3-alkoxy-13-Z-8,14-secogona-1,3,5(10),9(11)-tetraene-14,17-dione are dissolved in 54 ml. of benzene and, after addition of 125 mg. of para-toluenesulfonic acid monohydrate, the mixture is refluxed for 10 minutes using a water separator. After cooling and diluting with ether, the mixture is washed with aqueous sodium bicarbonate and water, dried over anhydrous potassium carbonate; and concentrated in vacuo to yield the corresponding 3-alkoxy-13-Z-gona-1,3,5(10), 8,14-pentaen-17-one compound.

EXAMPLE 7

Preparation of 3-alkoxy-13-Z-gona-1,3,5(10),8-tetraen-17-one compounds

Each of the respective 3-alkoxy-13-Z-gona-1,3,5(10),8, 14-pentaen-17-one compounds of Example 6 is converted into the corresponding 3-alkoxy-13-Z-gona-1,3,5(10),8-tetraen-17-one compound by the following procedure.

1.4 grams of the respective 3-alkoxy-13-Z-gona-1,3,5-(10),8,14-pentaen-17-one are dissolved in 50 ml. dry tetrahydrofuran and hydrogenated in the presence of 250 mg. palladium on barium carbonate catalyst. Hydrogenation is stopped after 1 stoichiometric equivalent of hydrogen is absorbed; the solution is filtered free of catalyst and concentrated in vacuo to yield the corresponding 3-alkoxy-13-Z-gona-1,3,5(10),8-tetraen-17-one compound.

EXAMPLE 8

Preparation of 3-alkoxy-13-Z-gona-1,3,5(10),8-tetraen-17β-ol compounds

Each of the respective 3-alkoxy-13-Z-gona-1,3,5(10),8-tetraen-17-one compounds of Example 7 is converted into the corresponding 3-alkoxy-13-Z-gona-1,3,5(10),8-tetraen-17β-ol compound by the following procedure.

1 gram of the respective 3-alkoxy-13-Z-gona-1,3,5(10), 8-tetraen-17-one is dissolved in 10 ml. of methanol and to this solution are added 500 mg. of NaBH₄ at 0° C.

EXAMPLE 9

Preparation of 3-alkoxy-13-Z-9α,14α-gona-2,5(10)-dien-17β-ol compounds

Each of the respective 3-alkoxy-13-Z-gona-1,3,5(10),8-tetraen-17β-ol compounds of Example 8 is converted into the corresponding 3 - alkoxy-13-Z-9α,14α-gona-2,5(10)-dien-17β-ol compound by the following procedure.

500 milligrams of the respective 17β-carbinol derivative obtained from Example 8 are dissolved in a mixture of 50 ml. dry ether and 50 ml. dry tetrahydrofuran and added to a solution of 100 ml. liquid ammonia. To this mixture is added 0.8 g. of potassium metal. After stirring for 30 minutes, there is added, successively, 80 ml. of absolute ethanol, 50 ml. of liquid ammonia and 2 g. of lithium metal. After decolorization, the ammonia is evaporated off; the residue is taken up in ether, washed with water, dried and concentrated in vacuo to yield the corresponding 3-alkoxy-13-Z-9α,14α-gona-2,5(10)-dien-17β-ol.

EXAMPLE 10

Preparation of 3-alkoxy-13-Z-gona-2,5(10)-dien-17-one compounds

Each of the respective 3-alkoxy-13-Z-9α-14α-gona-2,5 (10)-dien-17β-ol compounds of Example 9 is converted into the corresponding 3-alkoxy-13-Z-gona-2,5(10)-dien-17-one compound by the following procedure.

To a solution of 150 mg. of distilled aluminum isopropoxide in 5 ml. of anhydrous toluene are added 145 mg. of the respective 3-alkoxy-13-Z-9α-14α-gona-2,5(10)-dien-17β-ol with stirring. Distilled cyclohexanone (1.4 g.) is then added and the mixture refluxed for 2.5 hours. Aftercooling, a saturated solution of Rochelle salt (2 ml.) is added to decompose aluminum alcoholates. Toluene and cyclohexanone are removed under vacuo and the product is chromatographed on basic alumina and eluted with ether-petroleum ether mixtures to yield the corresponding 3-alkoxy-13-Z-gona-2,5(10)-dien-17-one.

EXAMPLE 11

Preparation of 3-alkoxy-13-Z-17α-haloethynyl-gona-2,5 (10)-dien-17-ol compounds

Each of the respective 3-alkoxy-13-Z-gona-2,5(10)-dien-17-one compounds of Example 10 is converted into the corresponding 3-alkoxy-13-Z-17α-haloethynyl-gona-2, 5(10)-dien-17-ol compound by the following procedure.

A solution consisting of 1.7 g. (1.32 cc.) of cis-1,2-dichloroethylene in 10 cc. of sodium-dried ether is added over 0.5 hour at 0° C. to 3 cc. of a 1.4 N-solution of methyl lithium (prepared by adding lithium to methyl iodide in dry ether solution under nitrogen at about 10° C.) in 25 cc. of sodium-dried ether. The reaction mixture is stirred at room temperature under nitrogen for an additional 1½ hours, followed by the addition, over a 15-minute period, of 100 mg. of the respective 3-alkoxy-13-Z-gona-2,5(10)-dien-17-one in 4 cc. of sodium-dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether (8.2). Crystallization from acid-free methanol affords the corresponding 3-alkoxy-13-Z-17α-chloroethynyl-gona-2,5(10)-dien-17-ol compound.

In accordance with the above procedure, but using 1,2-dibromoethylene in place of 1,2-dichloroethylene, there is obtained the corresponding 3-alkoxy-13-Z-17α-bromoethynyl-gona-2,5(10)-dien-17-ol.

EXAMPLE 12

Preparation of 3-alkoxy-13-Z-17α-ethynyl-gona-2,5(10)-dien-17-ol compounds

Each of the respective 3 - alkoxy-13-Z-gona-2,5(10)-dien-17-one compounds of Example 10 is converted into the corresponding 3 - alkoxy-13-Z-17α-ethynyl-gona-2,5(10)-dien-17-ol compound by the following procedure.

30 milliliters of liquid ammonia is charged into a 3-neck flask which has been cooled in Dry Ice and fitted with a stirrer, an inlet tube and an outlet tube. 2 grams of metallic potassium in small pieces are added and acetylene is introduced until the blue color is discharged, indicating the formation of potassium acetylide. A solution of 2.5 g. of the negative 3-alkoxy-13-Z-gona-2,5(10)-dien-17-one in 15 ml. of ether and 15 ml. of benzene is added with stirring at a temperature of —60° to —70° C. Acetylene is then bubbled through the slurry for 3 hours. The Dry Ice bath is removed and the ammonia is allowed to evaporate overnight. The residue is diluted with water, filtered and the filtrate extracted with benzene. The benzene extract is dried, concentrated in vacuo, chromatographed on silica gel and eluted with ether-petroleum ether mixtures to yield the corresponding 3-alkoxy-13-Z-17α-ethynyl-gona-2,5(10)-dien-17-ol.

EXAMPLE 13

Preparation of 3-alkoxy-13-Z-17α-vinyl-gona-2,5(10)-dien-17-ol and 3 - alkoxy-13-Z-17α-ethyl-gona-2,5(10)-dien-17-ol compounds A solution of 200 mg. of the respective 3-alkoxy-13-Z-17α-ethynyl-gona-2,5(10)-dien-17-ols of Example 12 in 10 ml. of ethylacetate is reduced with hydrogen in the presence of 25 mg. of Lindlar catalyst (lead deactivated palladium on a calcium carbonate support) at atmospheric pressure until one mole of hydrogen has been taken up. The product is filtered and the filtrate concentrated in vacuo. The concentrate is chromatographed on silica gel and eluted with ether-petroleum ether mixtures to yield the corresponding 3-alkoxy-13-Z-17α-vinyl-gona-2,5(10)-dien-17-ol and a solution of 200 mg. of the respective 3-alkoxy-13-Z-17α-ethynyl-gona-2,5(10)-dien-17-ols of Example 12 in 10 ml. of dioxane is reduced with hydrogen in the presence of 25 mg. of palladium on barium carbonate at atmospheric pressure until two moles of hydrogen have been taken up. The product is filtered, and the filtrate concentrated in vacuo and chromatographed on silica gel. Elution with ether-petroleum ether mixtures yields the corresponding 3-alkoxy-13-Z-17α-ethyl-gona-2,5(10)-dien-17-ol.

EXAMPLE 14

Preparation of 3-alkoxy-13-Z-17α-trifluoromethylethynyl-gona-2,5(10)-dien-17-ol compounds Each of the respective 3-alkoxy-13-Z-gona-2,5(10)-dien-17-one compounds of Example 10 is converted into the corresponding 3-alkoxy - 13-Z-17α-trifluoromethylethynyl-gona-2,5(10)-dien-17-ol compound by the following procedure.

A 50 ml. round bottom flask is fitted with a Dry-Ice condenser, a dropping funnel and a magnetic stirrer. After the addition of 210 mg. of metallic magnesium, the entire system is purged with nitrogen gas and flame dried. 5 ml. of dry ether is then added, followed by the dropwise addition, with stirring, of 1 ml. of ethyl bromide in 5 ml. of ether. After all the magnesium has reacted with the ethyl bromide, 5 ml. of trifluoropropyne (prepared by the reaction of propiolic acid with sulfur tetrafluoride) is distilled into the reaction flask and the mixture refluxed under Dry-Ice-acetone for one hour. The Dry-Ice-acetone condenser is then removed, the reaction allowed to warm to room temperature and the excess gaseous trifluoropropyne distilled off. A solution of 1.0 g. of the respective 3-alkoxy-13-Z-gona-2,5(10)-dien-17-one in 5 ml. of benzene and 5 ml. of ether is added and the mixture stirred for 16 hours at room temperature. Water is then added and the mixture extracted with ether. The ether extracts are washed with water until the washings are weakly basic, dried over sodium sulfate and concentrated in vacuo. The residue is chromatographed on silica gel and eluted with ether-petroleum ether mixture to yield the corresponding 3-alkoxy-13-Z-17α-trifluoromethylethynyl-gona-2,5(10)-dien-17-ol.

EXAMPLE 15

Preparation of 3-alkoxy-13-Z-17α-hydro-gona-2,5(10)-dien-17β-ol compounds

Each of the respective 3-alkoxy-13-Z-gona-2,5(10)-dien-17-one compounds of Example 10 is converted into the corresponding 3-alkoxy-13-Z-17α-hydro-gona-2,5(10)-dien-17β-ol compound by the following procedure.

A solution of 100 mg. of the respective 3-alkoxy-13-Z-gona-2,5(10)-dien-17-one in 20 ml. of methanol is treated with 20 mg. of sodium borohydride for 1 hour at 0° C. The solution is poured into aqueous sodium dihydrogen phosphate and the product is extracted with benzene, dried, and concentrated in vacuo, followed by chromatography on silica gel and elution with ether-petroleum ether mixtures to yield the corresponding 3-alkoxy-13-Z-17α-hydro-gona-2,5(10)-dien-17β-ol.

EXAMPLE 16

Preparation of 3-alkoxy-13-Z-17α-methyl-gona-2,5(10)-dien-17-ol compounds

Each of the respective 3-alkoxy-13-Z-gona-2,5(10)-dien-17-one compounds of Example 10 is converted into the corresponding 3-alkoxy-13 - Z-17α-methyl-gona-2,5(10)-dien-17-ol compound by the following procedure.

A solution of 300 mg. of the respective 3-alkoxy-13-Z-gona-2,5(10)-dien-17-one in 20 cc. of ether is treated with 1.4 ml. of 1 N methylmagnesium iodide in ether and the mixture is stirred for 1 hour at room temperature. The mixture is then diluted with water, and the resulting product is taken up in ether, dried and concentrated in vacuo. Chromatography over silica gel and elution with ether-petroleum ether mixtures yields the corresponding 3-alkoxy-13-Z-17α - methyl-gona-2,5(10)-dien-17-ol.

EXAMPLE 17

Preparation of 3-alkoxy-13-Z-17α-allyl-gona-2,5(10)-dien-17-ols

Using the same procedure as in Example 16, but substituting an allylmagnesium halide for the Grignard reagent therein, there are obtained as products the corresponding 3-alkoxy-13-Z-17α-allyl-gona-2,5(10)-dien-17-ols.

EXAMPLE 18

Preparation of 3-alkoxy-13-Z-17α-methallyl-gona-2,5(10)-dien-17-ols

Using the same procedure as in Example 16, but substituting a methallylmagnesium halide for the Grignard reagent therein, there are obtained as products the corresponding 3-alkoxy-13-Z-17α - methallyl-gona-2,5(10)-dien-17-ols.

EXAMPLE 19

Preparation of 3-alkoxy-13-Z-17α-vinyl-gona-2,5(10)-dien-17-ols

Using the same procedure as in Example 16, but substituting a vinylmagnesium halide for the Grignard reagent therein, there are obtained as products the corresponding 3-alkoxy-13-Z-17α-vinyl-gona-2,5(10)-dien-17-ols.

EXAMPLE 20

Preparation of 3-alkoxy-13-Z-17α-allyl-2,5(10)-dien-17-ols

Using the same procedure as in Example 16, but substituting an ethynylmagnesium halide for the Grignard reagent therein, there are obtained as products the corresponding 3-alkoxy-13-Z-17α-allyl-2,5(10)-dien-17-ols.

EXAMPLE 21

Preparation of 3-alkoxy-13-Z-17α-trifluorovinyl-gona-2,5(10)-dien-17-ol compounds Each of the respective 3-alkoxy-13-Z-gona-2,5(10)-dien-17-one compounds of Example 10 is converted into the corresponding 3-alkoxy-13-Z-17α-trifluorovinyl-gona-2,5(10)-dien-17-ol compound by the following procedure.

A solution of 300 mg. of the respective 3-alkoxy-13-Z-gona-2,5(10)-dien-17-one in 20 ml. of tetrahydrofuran is treated with 1.4 ml. of a 1 N solution of trifluorovinylmagnesium bromide in tetrahydrofuran. The solution is stirred at room temperautre for 3 hours and then diluted with water. The product is extracted with ether and chromatographed on silica gel. Elution with ether-petroleum ether mixtures yields the corresponding 3-alkoxy-13-Z-17α-trifluorovinyl-gona-2,5(10)-dien-17-ol.

EXAMPLE 22

This example illustrates a method of preparing the novel 3-alkoxy-13-Z-17α - alkyl-gona-2,5(10)-dien-17-ol compounds of this invention using an alkyllithium as the 17-keto additive. Each of the respective 3-alkoxy-13-Z-gona-2,5(10)-dien-17-one compounds of Example 10 is converted into the corresponding 3-alkoxy-13-Z-17α-alkyl-gona-2,5(10)-dien-17-ol compound by the following procedure.

A solution of 300 mg. of the respective 3-alkoxy-13-Z-gona-2,5(10)-dien-17-one in 20 cc. of ether is treated with 1.4 ml. of 1 N ethyllithium in ether and the mixture is stirred for 1 hour at room temperature. The mixture is then diluted with water, and the resulting product is taken up in ether, dried and concentrated in vacuo. Chromatography over silica gel and elution with ether-petroleum ether mixtures yields the corresponding 3-alkoxy-13-Z-17α-alkyl-gona-2,5(10)-dien-17-ol.

EXAMPLE 23

This example illustrates a method of converting the 17β-hydroxy steroids of Examples 11–22 into the corresponding 17β-alkanoyl ester derivatives thereof.

One-hundred mg. of the respective 17β-hydroxy steroid are heated with 1 cc. of acetic anhydride and 1.2 cc. of pyridine on a steam bath for 6 hours. The reaction mixture is then poured onto ice and extracted with chloroform. The extract is washed with water and concentrated. The concentrate is chromatographed over acid-washed alumina and eluted with mixtures of ether and petroleum ether to yield the corresponding 17β-acetoxygona esters.

Various changes and modifications may be made in carrying out the present invention without departing from the spirit and scope thereof. Insofar as these changes and modifications are within the purview of the annexed claims, they are to be considered as part of our invention.

We claim:

1. 3-alkoxy-13 - lower alkyl-17α - trifluorovinyl-17-hydroxygona-2,5(10)-dienes and the 17β-alkanoyl esters thereof, wherein said 13-lower alkyl radical contains at least 2 carbon atoms.

2. 3-alkoxy-13-lower alkyl-17α-trifluoromethylethynyl-17-hydroxygona-2,5(10)-dienes and the 17β-alkanoyl esters thereof, wherein said 13-lower alkyl radical contains at least 2 carbon atoms.

References Cited

UNITED STATES PATENTS

| | | | |
|---|---|---|---|
| 2,725,389 | 11/1955 | Colton | 260—397.4 |
| 2,838,530 | 6/1958 | Colton | 260—397.4 |
| 3,202,686 | 8/1965 | Hughes et al. | 260—397.45 |

OTHER REFERENCES

Fried et al., "Jour. Amer. Chem. Soc. (1961), vol. 83, pp. 4663–4664.

HENRY A. FRENCH, Primary Examiner

U.S. Cl. X.R.

260—397.4, 397.45, 590, 999